United States Patent Office
3,272,087
Patented Sept. 13, 1966

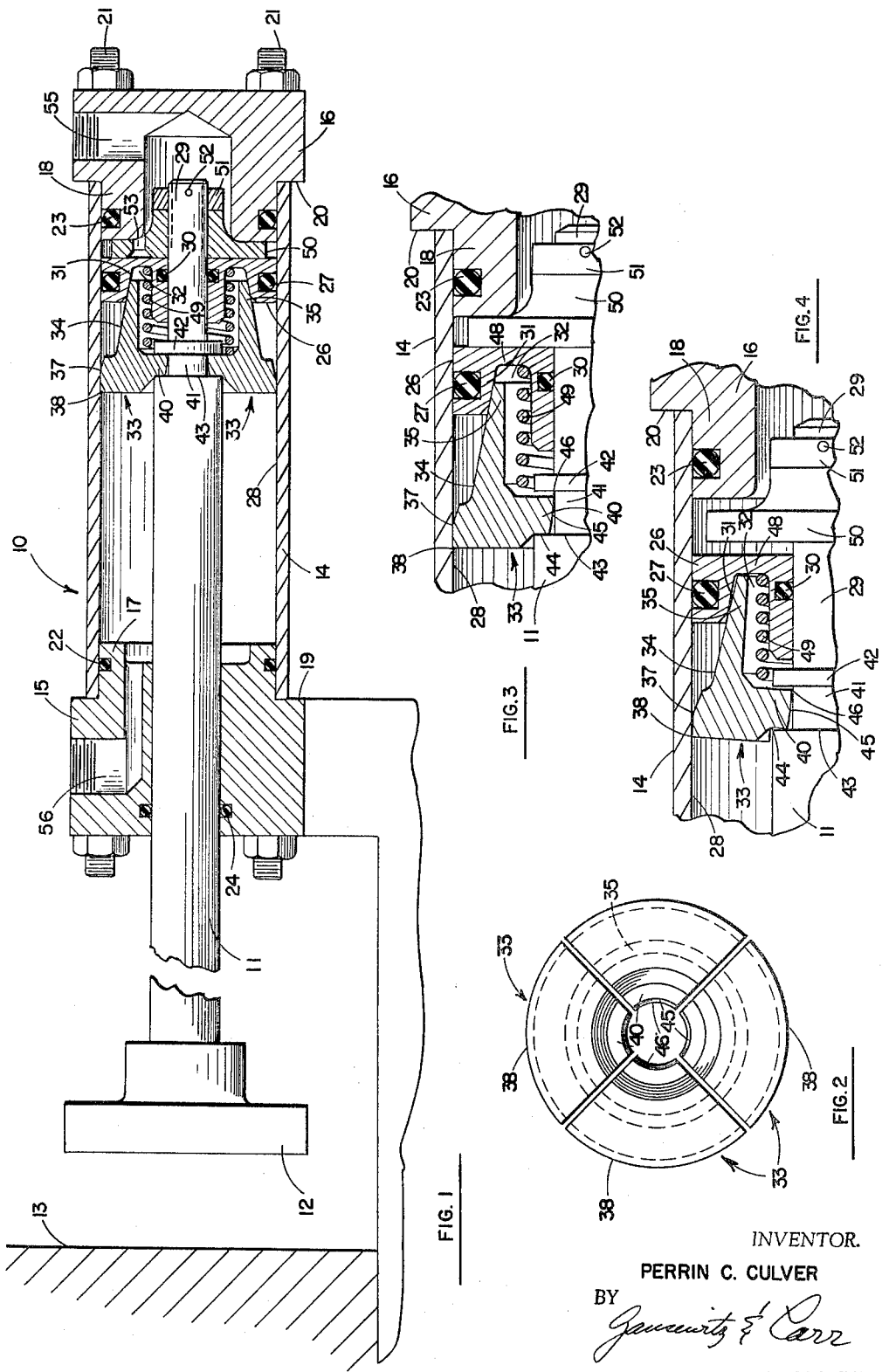

3,272,087
FORCE MULTIPLYING AND SAFETY POWER CYLINDER
Perrin C. Culver, Compton, Calif., assignor, by mesne assignments, to Compressed Air Service Company, Dayton, Ohio, a corporation of Ohio
Filed Oct. 9, 1964, Ser. No. 402,905
10 Claims. (Cl. 92—24)

This invention pertains to a power cylinder that exerts only a limited force against a yielding object, yet provides full force against a solid object. It also provides a force multiplication when a solid object is engaged.

The power cylinder of this invention can be used for a variety of purposes where movement of a ram is needed, such as for clamping a workpiece in a machine. It provides for the safety of the operator by coming to a stop after only a short increment of movement when a soft object, such as a hand or a finger, is encountered by the ram. On the other hand, it exerts a full clamping pressure against a workpiece or other unyielding object against which it is applied. During its final increment of movement, an internal mechanical advantage is realized so that the power cylinder exerts a higher force than a conventional power cylinder of comparable size.

These results are achieved by a design in which the piston transmits movement to the rod through a compression spring. The piston has an inner tapered surface that engages outer tapered surfaces of a plurality of collets which extend to a shoulder on the piston rod. The collets have arcuate peripheral surfaces adjacent the inner wall of the cylinder, and inner edge surfaces adjacent the surface of the rod. When a resistance is met by the rod sufficient to overcome the spring force, the piston is moved relative to the rod and the collets. The reaction of the tapered surfaces rotates the collets so that they wedge between the wall of the cylinder and the rod to stop the movement of the rod. Consequently, when a yielding object is met, the rod will be brought to a halt after traveling a limited additional distance. Thus, a hand or finger will not be crushed by the ram actuated by the rod because the mechanism will lock upon moving a short distance after resistance is met. On the other hand, during this final movement, the force exerted by the rod is greater than realized by a conventional power cylinder. As the collets are rotated through the cam action of the tapered surfaces, they act as cranks prying against the shoulder on the rod to provide a mechanical advantage so that a higher clamping force can be obtained than normally would result from the fluid pressure against the piston. Hence, the cylinder not only acts as a safety device, but as a force multiplier as well.

An object of this invention is to provide a safety-type power cylinder which will avoid injury to the operator.

Another object of this invention is to provide a power cylinder that offers a force multiplication.

An additional object of this invention is to provide a power cylinder that will move through only a limited distance when a resistance is met.

These and other objects will become apparent from the following detailed description taken in connection with the accompanying drawing in which:

FIGURE 1 is a longitudinal sectional view of the power cylinder of this invention as used in operating a clamping device;

FIGURE 2 is an end elevational view of the assembly of collets;

FIGURE 3 is an enlarged fragmentary sectional view illustrating the position of the piston and collets during the free travel of the piston; and FIGURE 4 is a view similar to FIGURE 3, illustrating the arrangement of the piston and collets after the rod has met a resistance to its movement.

With reference to the drawing, the power cylinder 10 of this invention includes an axially extensible rod 11 which, for purposes of illustration, is shown carrying a ram 12 at its outer end. This may be intended, for example, to clamp a workpiece against the fixed plate 13 adjacent the ram 12.

The cylinder assembly 10 is illustrated as including a cylindrical tubular member 14 at the ends of which are heads 15 and 16. The tube 14 overlaps disc portions 17 and 18 of the heads 15 and 16, and is held against shoulders 19 and 20 of the heads by bolts 21. O-rings 22 and 23 provide a fluid-tight seal at the connections between the tube 14 and the cylinder heads. An additional O-ring 24 seals against the rod 11 where it extends through the cylinder head 15.

Within the cylinder is a piston 26, sealed by an O-ring 27 with respect to the inner circumferential wall 28 of the tube 14. The piston 26 circumscribes end portion 29 of the rod 11, which is of reduced diameter, and the piston is slidable relative to the rod. Hence, there is an additional O-ring 30 that seals the piston with respect to the rod.

The piston 26 includes an inner frusto-conical surface 31 that flares outwardly toward the cylinder head 15. This provides an annular recess 32 in the forward face of the piston. Four locks or collets 33 have sloping outer surfaces 34 on their rearward extensions 35, and these outer surfaces taper similarly to the frusto-conical surface 31 of the piston. In the position of FIGURES 1 and 3, the ends 35 of the collets are received partially in the recess 32 in the piston, and the surfaces 34 at this location lie complementary along the tapered inner surface 31 of the piston.

Forwardly of the tapered outer surfaces 34, the collets project in the radial direction toward the cylinder wall 28. At this location, the collets include arcuate edges 37, which incline inwardly toward the axis of the cylinder in the rearward direction toward the piston 26. The forward corner portions 38 of the arcuate surfaces 37 are adjacent the cylinder wall 28.

The collets 33 are carried by the rod 11, and include inner flanges 40 which extend into an annular groove 41 in the rod 11 defined between a collar 42 and a shoulder 43 where the rod diameter increases. The forward edges 44 of the flanges 40 bear against the shoulder 43. The inner surfaces 45 of the flanges 40 taper slightly away from the rod surface toward the shoulder 43. The rearward corners 46 of the flange 40 lie against the peiphery of the rod 11 in the groove 41, and are closer to the piston 26 than are the forward collet corners 38.

Interposed between the flanges 40 of the collets 33 and the radial wall 48 of the piston 26 within the recess 32 is a compression spring 49. A plate 50 is positioned in back of the piston 26 to hold the assembly together, being retained to the rod 11 by means of a collar 51 through which extends a pin 52. A fluid passage 53 is provided through the plate 50.

The power cylinder of this invention is adapted for either hydraulic or pneumatic operation. Pressurized fluid to drive the rod through its ram stroke is admitted through inlet opening 55 in the cylinder head 16, while an opening 56 in the cylinder head 15 permits fluid to be introduced to drive the rod through its return stroke.

In operation of the device, pressurized fluid entering through the port 55 reacts against the piston 26 so as to exert a force urging the piston to the left as the device is shown. This force is transmitted through compression spring 49 to the flanges 40 of the collets and thence through the shoulder 43 to the rod 11. Consequently, when the pressurized fluid is admitted, the piston through the spring 49 drives the rod 11 to the left as the device is illustrated. The spring 49 holds the collet flange surfaces 44 flat against the rod shoulder 43 during this travel, so that the collets accompany the rod 11 and move only axially with respect to the cylinder 10. It is desirable to have the spring bear against the collets, therefore, but it is possible optionally to construct the invention to provide engagement of the spring and rod directly.

When the ram 12 encounters an object, a resisting force will be imposed on the rod 11. This will tend to hold the rod as the fluid continues to exert pressure against the piston 26. Therefore, when an appropriate resistance is met, the spring 49 will become compressed by the resistance to the fluid force on the piston. As this occurs, there is relative movement between the piston and the collets 33 and rod 11. As a result, the tapered piston surface 31 rides along the tapered surfaces 34 of the collets as the ends 35 of the collets move further into the recess 32 in the face of the piston (see FIGURE 4). This relative movement between the piston and the collets causes a reaction between the tapered surfaces of the collets and the piston, which act as cams to move the ends 35 of the collets inwardly toward the axis of the rod 11. Thus, the upper collet shown in FIGURES 3 and 4 will be rotated clockwise as the device is illustrated.

This rotation of the collets has two effects. For one, the shoulders 44 of the flanges 40 press against shoulder 43 of the rod 11 to move the rod to the left. The collets rock about their outer edges as this occurs. Hence, the collets act as levers, with the forward edges 44 prying against the rod so as to move the rod to the left. The result is that there is a mechanical advantage so that a greater force is exerted on the rod than normally would result from the reaction of the fluid against the piston head. The mechanical advantage is realized as soon as a resistance is met sufficient to result in relative movement between the piston 26 and the rod 11. Therefore, when the ram 12 is clamping against a hard unyielding workpiece, a force multiplication is realized so that the power cylinder of this invention obtains a materially increased holding force.

Also, as the collets rock about their outer surfaces 37, the collets become wedged between the cylinder wall 28 and the periphery of the rod 11 at the groove 41. In other words, as each collet is rotated, its front outer corner 38 and the rearward inner corner 46 are brought more nearly into radial alignment. This, in effect, increases the radial thickness at the forward portion of the collets so that a wedging action takes place. Consequently, the outer corner 38 is driven tightly against the circumferential wall 28 of the cylinder, where it becomes retained by the high frictional force generated. As a result, the collets are locked in place after a relatively short increment of movement when the object is encountered by the ram 12. If the operator's hand should happen to be between the ram 12 and the plate 13, for example, the ram will only move a short distance until the mechanism locks. Even though a higher force is exerted during the last increment of movement, the rod 11 will be stopped automatically after a limited short distance. Thus, the hand cannot become crushed because the ram automatically stops. This means that the device is absolutely safe for the use of the operator, and it is impossible for him to crush his hands or fingers. Therefore, not only is the force multiplication achieved with the device of this invention, but also all hazards of use are eliminated.

The cylinder is unlocked and returned to its original position simply by admitting pressurized fluid into the port 56. This fluid will pass through the spaces between the collets and react against the piston to move the piston to the right so that it no longer wedges inwardly against the collet surfaces 34. Thus, the power cylinder of this invention can be used in the normal manner, but nevertheless retains its safety features.

Upon the return stroke the plate 50 strikes the cylinder head 16 as the mechanism is brought back to the position of FIGURE 1. This stops the rod 11 and prevents engagement of the piston 26 with the cylinder head, which assures that the device will not go into its locked position when returned. If the piston were to be stopped rather than the rod, inertia would carry the collet ends 35 into the recess 32 and hence cause the collets to rotate and lock the mechanism.

The amount of force multiplication obtained depends upon the ratio of the axial length of the collets to their radial dimensions. The greater this ratio, the higher the mechanical advantage. The invention, therefore, has versatility and may be designed to suit particular requirements.

The foregoing detailed description is to be clearly understood as given by way of illustration and example only, the spirit and scope of this invention being limited solely by the appended claims.

I claim:
1. A power cylinder device comprising
   a cylinder,
   piston means in said cylinder and movable through a stroke relative thereto,
   a rod means in said cylinder and extending outwardly therefrom,
      said piston means being movable relative to said rod means,
   resilient means interconnecting said piston means and said rod means for transmitting a force from said piston means to said rod means,
   and lock means for said rod means, said lock means including a plurality of members interposed between said rod and the inner circumferential wall of said cylinder, each of said members having a forward outer corner adjacent said wall and an inner rearward corner adjacent the periphery of said rod means,
      said lock means being operable by said piston means upon relative movement of said piston means and said rod means in opposition to said resilient means,
         for rotating said members so as to bring said forward outer corner and said rearward inner corner of each of said members respectively into wedging engagement with said wall of said cylinder and said periphery of said rod means for precluding movement of said rod means through more than a predetermined limited increment of travel upon said relative movement.

2. A power cylinder device comprising
   a cylinder,
   a piston reciprocative in said cylinder,
   a rod one end portion of which is received in said cylinder,
      said piston being movable relative to said rod,
   resilient means interconnecting said piston and said rod for causing said rod to move normally with said piston toward one end of said cylinder,
      and for permitting relative movement of said rod and piston upon the generation of a predetermined force resisting such movement of said rod,
   and at least one lock member,
      said lock member being carried by said rod, said lock member having a portion provided with opposite corners spaced apart a greater distance than the space between the periphery of said rod and the wall of said cylinder,
         and pivotal relative to said rod to bring said corners into engagement with said wall of said cylinder and said periphery of said rod so that said portion of said lock member is wedged between said rod and the inner periphery of said cylinder for thereby preventing further movement of said rod toward said one end of said cylinder, said piston including means for causing such pivotal movement of said lock member upon said relative movement of said rod and piston.

3. A force-applying device comprising
a cylinder,
a piston reciprocative through a stroke in said cylinder,
a rod in said cylinder and extending outwardly therefrom,
a plurality of collets
having inner edges adjacent said rod, and outer edges adjacent the wall of said cylinder, said edges having opposite corners spaced apart a greater distance than the distance between said wall of said cylinder and the periphery of said rod,
said rod having abutment means engaged by inner edge portions of said collets,
and a compression spring for transmitting force from said piston to said rod,
said collets having surface means remote from said inner edge portions engaged by said piston,
and said piston including surface means cooperative with said surface means of said collets for imparting pivotal movement to said collets to cause said outer corner to wedge against said wall of said cylinder and said inner corner to wedge against said periphery of said rod upon relative movement of said piston with respect to said collets in opposition to said spring.

4. A power cylinder device comprising
a cylinder,
a piston in said cylinder and reciprocative through a stroke relative thereto,
a rod one end portion of which is received in said cylinder,
said piston being movable relative to said rod, resilient means interconnecting said piston and said rod for causing said rod to move normally with said piston through said stroke toward one end of said cylinder,
and for permitting said piston to move relative to said rod upon the generation of a predetermined force resisting said movement of said rod with said piston,
and at least one lock member carried by said rod,
said lock member having an outer periphery adjacent the inner circumferential wall of said cylinder,
and an inner periphery adjacent said rod,
said lock member being pivotal to wedge said outer and inner peripheries respectively against said circumferential wall of said cylinder and against said rod for thereby preventing movement of said rod relative to said cylinder,
said lock member and said piston having interengageable cam surface means for imparting said pivotal movement to said lock member upon said relative movement of said piston and rod.

5. A device as recited in claim 4 in which
said lock member and said rod include interengaging abutment surfaces,
said lock member upon said pivotal movement thereof prying on said abutment surface of said rod to impart axial movement to said rod.

6. A power cylinder device comprising
a cylinder,
a piston in said cylinder and reciprocative through a stroke relative thereto,
a rod one end portion of which is received in said cylinder,
said piston being movable relative to said rod, resilient means interconnecting said piston and said rod for causing said rod to move normally with said piston through said stroke toward one end of said cylinder,
and for permitting said piston to move relative to said rod upon the generation of a predetermined force resisting said movement of said rod with said piston,
and at least one lock member carried by said rod,
said lock member having an outer edge having a forward corner adjacent the inner circumferential wall of said cylinder,
and an inner edge having a rearward corner adjacent the periphery of said shaft,
said forward corner being axially closer to said one end of said cylinder than said rearward corner,
said lock member having an inner forward abutment surface,
said rod having an abutment surface engaged by said inner forward abutment surface of said lock member,
said lock member having a rearward extension,
said rearward extension projecting toward said piston,
said piston and rearward extension having interengaging cam surfaces for rotating said rearward extension inwardly toward the axis of said rod upon said relative movement of said piston and rod
for thereby causing said abutment surface of said lock member to pry against said abutment surface of said rod and move said rod forwardly through a relatively short distance,
and for causing said forward and rearward corners to frictionally lock against said inner circumferential wall and said shaft, respectively, to preclude further forward movement of said shaft beyond said relatively short distance.

7. A device as recited in claim 6 in which for said cam means said piston includes
a surface outwardly of said rearward extension and in engagement with the outer surface of said rearward extension,
at least one of said surfaces being inclined inwardly toward the axis of said cylinder and away from said one end of said cylinder,
whereby upon said relative movement of said piston and rod said surfaces react to cause said rotation of said rearward extension.

8. A force-applying device comprising
a cylinder,
a piston in said cylinder,
a rod in said cylinder projecting outwardly from one end thereof,
said piston circumscribing said rod and being slidable relative thereto,
said piston including an annular recess in the face thereof adjacent said one end of said cylinder,
said annular recess having a circumferential surface flaring outwardly toward said one end,
a plurality of collets,
said collets having a forward portion adjacent said one end of said cylinder,
said forward portion having an outer forward edge adjacent the circumferential wall of said cylinder,
and an inner rearward edge adjacent said rod,
said rod having abutment means engaged by the forward portion of said collets,
said collets having rearward portions extending into said annular recess and in engagement with said circumferential surface of said recess,
and a compression spring interposed between said piston and said collets for transmitting forces from said piston to said collets and through said collets to said rod,
    said circumferential surface of said piston reacting against said rearward portions of said collets for rocking said collets by pivoting said rearward portions inwardly upon relative movement of said piston with respect to said rod in opposition to said spring,
        for thereby wedging said forward outer edges against the circumferential wall of said cylinder and locking said collets with respect thereto for thereby precluding further movement of said rod.

9. A power cylinder device comprising
a cylinder,
a piston reciprocative in said cylinder,
a rod one end portion of which extends through one end of said cylinder and is received in said cylinder,
    said piston having an aperture therethrough slidably receiving said rod,
a plurality of collets,
    each of said collets including a radial outer portion having a corner on the forward edge thereof adjacent said one end of said cylinder,
    and having a radial inner portion having a rearward corner remote from said one end of said cylinder and adjacent said rod,
        said rearward corner being axially farther from said one end of said cylinder than is said forward corner,
said rod having a shoulder,
    said collets having radially inner forward surfaces engaging said shoulder,
each of said collets having a rearward extension extending generally longitudinally of said cylinder to a location farther from said one end of said cylinder than said rearward edges,
said piston having a recess in the forward face thereof,
    said extensions projecting partially into said recess,
and a compression spring interposed between said piston and said collets
    engaging said collets radially inwardly of said extensions
        for transmitting forces from said piston through said spring to said collets and thence through said shoulder to said rod for causing said rod normally to move with said piston toward said one end of said cylinder,
said piston being movable in opposition to said spring relative to said collets and rod upon the the generation of a predetermined resistance to said movement of said rod,
said piston in said recess and said extensions of said collets having interengaging cam means operable upon said relative movement for rotating said extensions inwardly toward the axis of said rod,
    thereby to cause said forward surfaces to pry against said shoulders to move said rod forwardly,
    and to wedge said forward and rearward corners against said cylinder wall and said rod, respectively, for thereby locking said rod against further forward movement thereof.

10. A device as recited in claim 9 in which for said cam means said piston includes
an annular surface of substantially frusto-conical configuration tapering inwardly toward said axis and away from said one end,
    said extensions of said collets having similarly tapering exterior surfaces engaging said annular surface of said piston,
        whereby when said collet extensions progress inwardly with respect to said recess said surfaces react to effect said rotation of said extensions.

References Cited by the Examiner

UNITED STATES PATENTS

| | | | |
|---|---|---|---|
| Re. 25,334 | 2/1963 | Michalak | 92—84 X |
| 1,965,106 | 7/1934 | McDougall | 92—29 X |
| 3,160,078 | 12/1964 | Hiemstra et al. | 92—29 X |

MARTIN P. SCHWADRON, *Primary Examiner.*

EDGAR W. GEOGHEGAN, *Examiner.*

I. C. COHEN, *Assistant Examiner.*